United States Patent
Hartman et al.

(10) Patent No.: US 9,870,334 B2
(45) Date of Patent: Jan. 16, 2018

(54) DENSE, NESTED ARRANGEMENT OF MULTIPLE PERIPHERAL COMPONENT INTERCONNECT EXPRESS (PCIE) CARDS WITHIN A THIN SERVER VOLUME

(71) Applicant: DELL PRODUCTS, L.P., Round Rock, TX (US)

(72) Inventors: Corey Dean Hartman, Hutto, TX (US); Shawn Dube, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 331 days.

(21) Appl. No.: 14/612,442

(22) Filed: Feb. 3, 2015

(65) Prior Publication Data

US 2016/0224497 A1    Aug. 4, 2016

(51) Int. Cl.
*H05K 7/10*    (2006.01)
*G06F 13/40*   (2006.01)
*G06F 13/42*   (2006.01)

(52) U.S. Cl.
CPC ........ *G06F 13/409* (2013.01); *G06F 13/4022* (2013.01); *G06F 13/4068* (2013.01); *G06F 13/4282* (2013.01)

(58) Field of Classification Search
USPC .................................................. 710/300–317
See application file for complete search history.

(56) References Cited

U.S. PATENT DOCUMENTS

| | | | |
|---|---|---|---|
| 6,487,623 B1 * | 11/2002 | Emerson | G06F 13/4081 710/302 |
| 6,491,526 B2 | 12/2002 | Leman | |
| 6,731,515 B2 | 5/2004 | Rhoads | |
| 6,749,439 B1 | 6/2004 | Potter et al. | |
| 6,754,084 B1 | 6/2004 | Bolognia et al. | |
| 6,830,458 B2 * | 12/2004 | Kobayashi | G06F 1/184 361/679.58 |
| 7,359,216 B2 * | 4/2008 | Hall | G06F 1/185 361/679.55 |
| 7,440,293 B2 | 10/2008 | Hood, III et al. | |
| 7,739,441 B1 * | 6/2010 | Lee | G11C 5/04 710/306 |

* cited by examiner

Primary Examiner — Raymond Phan
(74) Attorney, Agent, or Firm — Isidore PLLC (57) ABSTRACT

An information handling system (IHS) server volume includes at least two pairs of flexible peripheral component interconnect express (PCIe) media for connecting data signals and power supply signals via riser cards mounted against respective PCIe devices in large adjacent physical slot locations. A first PCIe device corresponding to a first riser card and a second PCIe device corresponding to a second riser card are relatively positioned to enable the second riser card to be fitted within a specified space between the first PCIe device and the first riser card while a footprint of a first PCIe connector corresponding to the first PCIe device overlaps a footprint of a second PCIe connector corresponding to the second PCIe device. First and second PCIe cards provided by the first and second PCIe devices respectively are inserted into respective PCIe connectors via the first pair of riser cards having a dense nested arrangement.

28 Claims, 11 Drawing Sheets

DENSE, NESTED ARRANGEMENT OF MULTIPLE PERIPHERAL COMPONENT INTERCONNECT EXPRESS (PCIE) CARDS WITHIN A THIN SERVER VOLUME

BACKGROUND

1. Technical Field

The present disclosure generally relates to information handling systems (IHS) and in particular to design and configuration of interface systems within information handling systems.

2. Description of the Related Art

As the value and use of information continue to increase, individuals and businesses seek additional ways to process and store information. One option available to users is information handling systems. An information handling system (IHS) generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Large scale IHSes are often designed using a 1 U or thin server volume to support the various requirements of the various IT gear included within the IHS. However, in a 1 U or thin server volume, standard Peripheral Component Interconnect (PCI) cards can quickly fill the available volume. In fact, the unusual shape of standard PCI brackets results in wasted space in a 1 U/thin server application. More specifically, as a result of a desire for balancing four (4) graphics processing unit (GPU) cards with 2 processors, fitting 4× Double Wide PCI cards is desired across a 1 U/thin 19" standard server bulkhead. However, no more than 3×DW, Full PCI can fit within 1 U server volume, using standard mounting and connecting methods.

In a conventional system, the available space is used up as a result of the conventional designs of: the PCI bracket; the edge connection on interface cards; and the riser. As a result of one or more of these conventional design features associated with PCI brackets and/or PCI systems, Low Profile (LP) or Singlewide card applications which utilize some similar design features are presented with similar challenges.

BRIEF SUMMARY

Disclosed are a method and an information handling system (IHS) for providing dense and nested peripheral component interconnect express (PCIe) mounting within the IHS configured as a 1 U or thin server volume. According to one aspect, the server volume includes at least two pairs of flexible PCIe media for connecting data signals and power supply signals via riser cards mounted against respective PCIe devices in large adjacent physical slot locations. A first PCIe device corresponding to a first riser card and a second PCIe device corresponding to a second riser card are relatively positioned to enable the second riser card to be fitted within a specified space between the first PCIe device and the first riser card while a footprint of a first PCIe connector corresponding to the first PCIe device overlaps a footprint of a second PCIe connector corresponding to the second PCIe device. First and second PCIe cards provided by the first and second PCIe devices respectively are inserted into respective PCIe connectors via the first pair of riser cards having a dense nested arrangement. Similarly, third and fourth PCIe devices positioned in physical slot locations adjacent to the slot locations for the first and second PCIe devices are connected using a second pair of nested riser cards.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method and an information handling system (IHS) for providing a dense and nested peripheral component interconnect express (PCIe) mounting within the IHS utilizing a 1 U or thin server volume. Disclosed are a method and an information handling system (IHS) for providing dense and nested peripheral component interconnect express (PCIe) mounting within the IHS configured as a 1 U or thin server volume. According to one aspect, the server volume includes at least two pairs of flexible PCIe media for connecting data signals and power supply signals via riser cards mounted against respective PCIe devices in large adjacent physical slot locations. A first PCIe device corresponding to a first riser card and a second PCIe device corresponding to a second riser card are relatively positioned to enable the second riser card to be fitted within a specified space between the first PCIe device and the first riser card while a footprint of a first PCIe connector corresponding to the first PCIe device overlaps a footprint of a second PCIe connector corresponding to the second PCIe device. First and second PCIe cards provided by the first and second PCIe devices respectively are inserted into respective PCIe connectors via the first pair of riser cards having a dense nested arrangement. Similarly, third and fourth PCIe devices positioned in physical slot locations adjacent to the slot locations for the first and second PCIe devices are connected using a second pair of nested riser cards.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Those of ordinary skill in the art will appreciate that the hardware, firmware/software utility, and software components and basic configuration thereof depicted in the following figures may vary. For example, the illustrative components of IHS 100 (FIG. 1) are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

Figure 1:
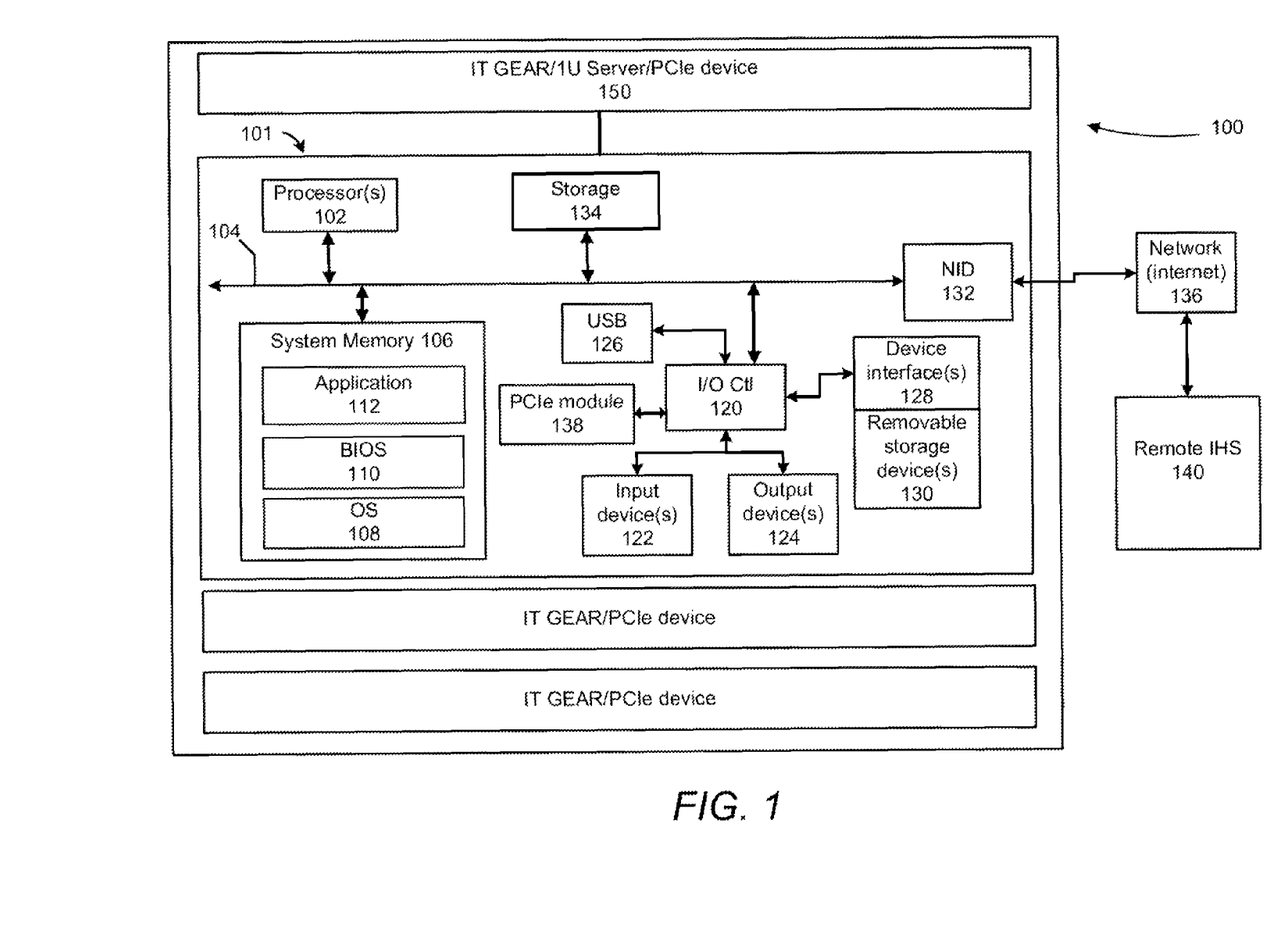
FIG. 1 illustrates an example information handling system (IHS) within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, there is illustrated a block diagram representation of a rack-based IHS 100 having multiple IT gear 150 inserted therein. Example IT gear 101, which can be individually considered a server IHS and/or a 1 U server IHS, includes one or more processor(s) 102 coupled to system memory 106 via system interconnect 104. System interconnect 104 can be interchangeably referred to as a system bus, in one or more embodiments. Also coupled to system interconnect 104 is storage 134 within which can be stored one or more software and/or firmware modules and/or data (not specifically shown). In one embodiment, storage 134 can be a hard drive or a solid state drive. The one or more software and/or firmware modules within storage 134 can be loaded into system memory 106 during operation of IHS 100. As shown, system memory 106 can include therein a plurality of modules, including Basic Input/Output System (BIOS) 110, operating system (O/S) 108, applications 112 and firmware (not shown). The various software and/or firmware modules have varying functionality when their corresponding program code is executed by processor(s) 102 or other processing devices within IT gear 101. As illustrated, IT gear 101 is located/placed within a larger structure of IHS 100 (generally illustrated in FIG. 1 as a surrounding exterior line, with specific structural details provided in FIGS. 2-10).

In one or more embodiments, BIOS 110 comprises additional functionality associated with unified extensible firmware interface (UEFI), and can be more completely referred to as BIOS/UEFI 110 in these embodiments. The various software and/or firmware modules have varying functionality when their corresponding program code is executed by processor(s) 102 or other processing devices within IT gear 101.

IT gear 101 further includes one or more input/output (I/O) controllers 120 which support connection to and processing of signals from one or more connected input device(s) 122, such as a keyboard, mouse, touch screen, or microphone. I/O controllers 120 also support connection to and forwarding of output signals to one or more connected output device(s) 124, such as a monitor or display device or audio speaker(s). In addition, IT gear 101 includes universal serial bus (USB) 126 which is coupled to I/O controller 120. In one embodiment, IT gear 101 represents a peripheral component interconnect express (PCIe) device and includes PCIe module 138 which is coupled to I/O controller 120. Additionally, in one or more embodiments, one or more device interface(s) 128, such as an optical reader, a universal serial bus (USB), a card reader, Personal Computer Memory Card International Association (PCMCIA) port, and/or a high-definition multimedia interface (HDMI), can be associated with IT gear 101. Device interface(s) 128 can be utilized to enable data to be read from or stored to corresponding removable storage device(s) 130, such as a compact disk (CD), digital video disk (DVD), flash drive, or flash memory card. In one or more embodiments, device interface(s) 128 can also provide an integration point for connecting other device(s) to IT gear 101. In one implementation, IT gear 101 connects to remote IHS 140 using device interface(s) 128. In such implementation, device interface(s) 128 can further include General Purpose I/O interfaces such as I²C, SMBus, and peripheral component interconnect express (PCIe) buses.

IT gear 101 comprises a network interface device (NID) 132. NID 132 enables IHS 100 to communicate and/or interface with other devices, services, and components that are located external to IT gear 101. These devices, services, and components can interface with IHS 100 via an external network, such as example network 136, using one or more communication protocols. In particular, in one implementation, IHS 100 uses NID 132 to connect to remote IHS 140 via an external network 136.

Network 136 can be a wired local area network, a wireless wide area network, wireless personal area network, wireless local area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

Figure 2:
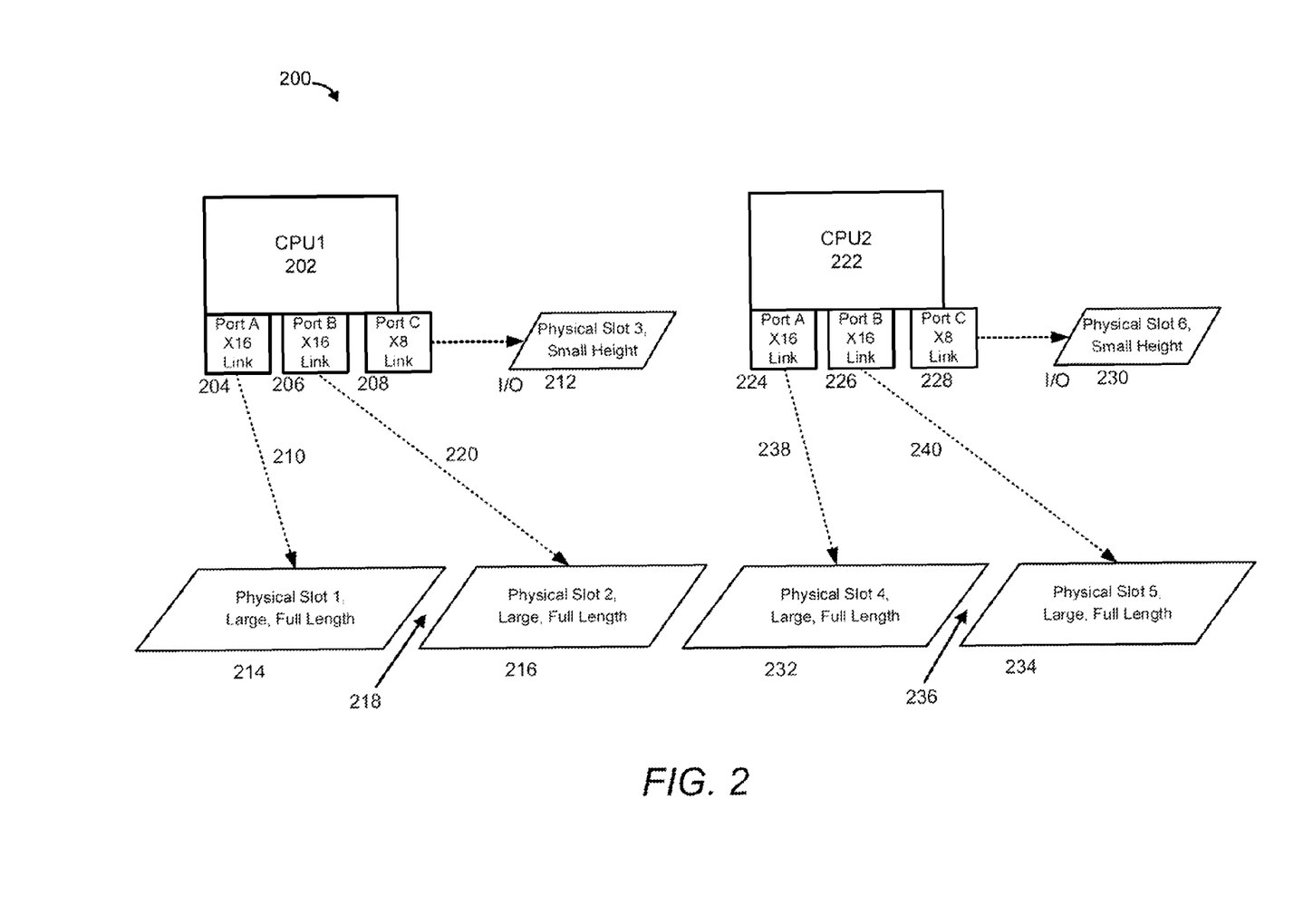
FIG. 2 illustrates an example 1 U server volume which includes two CPUs directly coupled via Peripheral Component Interconnect Express (PCIe) links to four (4) large adjacent physical slots for PCIe devices, respectively, according to one or more embodiments.

With specific reference now to FIG. 2, there is depicted an example 1 U server volume which includes two CPUs directly coupled via Peripheral Component Interconnect Express (PCIe) links to four (4) large adjacent physical slots for information technology (IT) gear, such as PCIe devices. The PCIe devices include respective PCIe cards, which can be graphics processing units (GPUs), according to one embodiment. Server volume 200 represents a 1 U server volume which includes a system board/motherboard (not shown). The server volume is divided into a plurality of spaces sized according to requirements of corresponding, inserted electronic components and designed to support various mechanical and cooling attributes. For example, the four (4) large IT gear are located in a first 1 U space which includes and/or is divided into four large physical slots into which the IT gear are inserted, respectively.

Server volume 200 further comprises first central processing unit (CPU) 202 and second CPU (CPU2) 222. First CPU 202 is coupled via first high bandwidth port "Port A X16 Link" 204 and second high bandwidth port "Port B X16 Link" 206, using first and second flexible PCIe media 210 and 220, to first electronic components (not shown) in first large "Physical Slot 1" 214 and second large "Physical Slot 2" 216, respectively. An example of the first electronic component used on this PCIe bus is a PCIe device which provides a PCIe card such as a graphics processing unit (GPU). In addition, first CPU 202 is coupled via first lower bandwidth port "Port C X8 Link" 208 to a second electronic component (not shown), such as an I/O card and/or a communication card, in first smaller Input/Output (I/O) "Physical Slot 3" 212. Similarly, second CPU 222 is coupled via third high bandwidth port "Port A X16 Link" 224 and fourth high bandwidth port "Port B X16 Link" 226, using third and fourth flexible PCIe media 238 and 240, to third electronic components (not shown) in third large "Physical Slot 4" 232 and fourth large "Physical Slot 5" 234, respectively. In addition, second CPU 222 is coupled via second lower bandwidth port "Port C X8 Link" 228 to fourth electronic component (not shown), such as an I/O card and/or a communication card, in second Input/Output (I/O) "Physical Slot 3" 230.

As described, server volume 200 includes four large physical slots in adjacent positions enabling four electronic components to be respectively inserted into the four large physical slots and to be coupled via PCIe to a corresponding CPU. In particular, CPU ports are connected to corresponding physical slot location via PCIe lanes. The PCIe lanes are routed out of a corresponding CPU to a corresponding large physical slot within the 1 U server volume using flexible signal cable routing (e.g., flexible PCIe media 210, 220, 238, 240). The flexible signal cable routing is coupled to a first riser card (not shown). The first riser card and a second riser card coupled to another PCIe link are physically arranged adjacent to each other in a joint and nested configuration within a first narrow sub-slot (e.g., sub-slot 218) between adjacent physical slot locations (e.g., first large "Physical Slot 1" 214 and second large "Physical Slot 2" 216) corresponding to the first and second IT gear, respectively, to provide a first nested pair/assembly of adjacent riser cards. Similarly, a third riser card and a fourth riser card coupled to respective PCIe links are physically arranged adjacent to each other in a joint and nested configuration within a second narrow sub-slot (e.g., sub-slot 236) between adjacent physical slot locations (e.g., third large "Physical Slot 4" 232 and fourth large "Physical Slot 5" 234) corresponding to a third and fourth IT gear, respectively, to provide a second nested pair/assembly of adjacent riser cards. The nested configuration of adjacent riser cards is further described within the following figures.

Although the disclosure is specifically described with reference to PCIe connectivity, through the use of terms such as 'PCIe media', 'PCIe links', 'PCIe connectors' and 'PCIe cards', other standards, including (conventional) PCI, for connecting selected hardware components and/or peripheral components can be utilized. In addition, more general terminology associated with other peripheral standards (i.e., in addition to 'PCIe') such as the term 'peripheral' can be substituted for 'PCIe' and/or can be utilized as well to cover those use cases that include these other peripheral devices or peripheral interconnects. For example, although the term 'PCIe card' is frequently utilized within the disclosure, a more general term such as 'peripheral card' can also apply.

Figure 3:
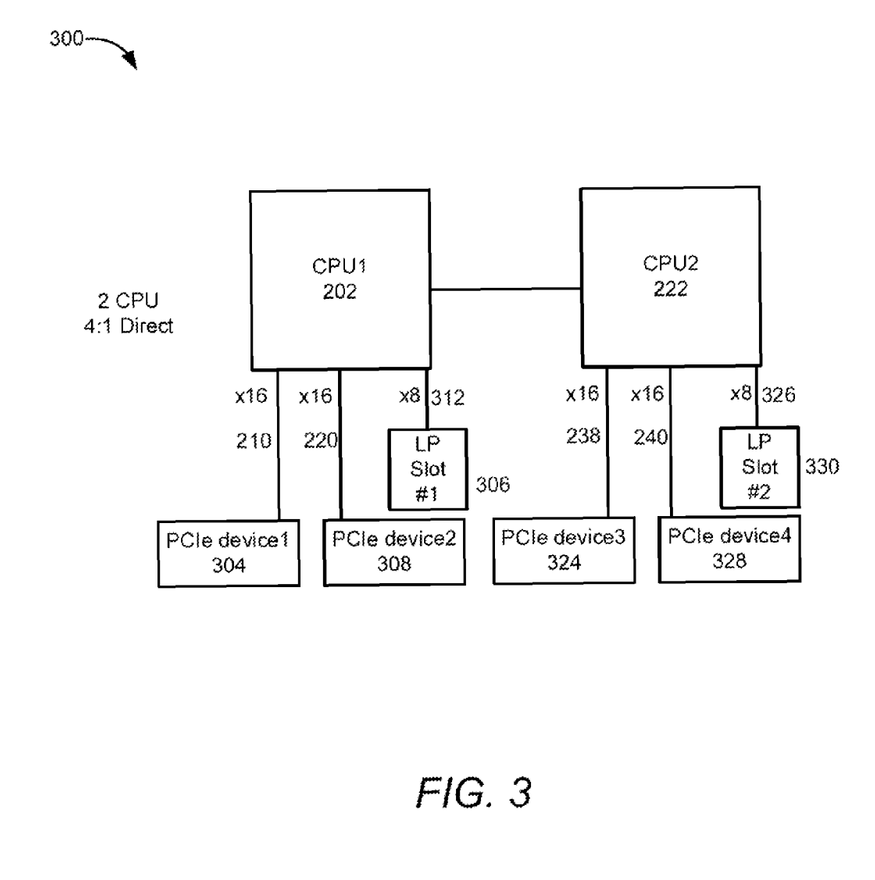
FIG. 3 illustrates an example 1 U server volume which includes two CPUs directly coupled via PCIe links to four (4) adjacent PCIe devices in corresponding large physical slots, according to one embodiment.

FIG. 3 illustrates an example 1 U server volume which includes two CPUs directly coupled via Peripheral Component Interconnect Express (PCIe) links to four (4) adjacent PCIe devices providing PCIe cards, e.g., graphics processing units (GPUs), in corresponding large physical slots, according to one embodiment. Server volume 300 comprises first central processing unit (CPU1) 202 and second CPU (CPU2) 222. First CPU 202 is coupled via first high bandwidth "X16" link 210 and second high bandwidth "X16" link 220 to PCIe devices 304 and 308, in first large "Physical Slot 1" 214 (FIG. 2) and second large "Physical Slot 2" 216 (FIG. 2), respectively. In addition, first CPU 202 is coupled via first lower bandwidth "X8" link 312 to an electronic component (not shown), such as an I/O card and/or a communication card, in first smaller, low profile "LP slot #1" 306. Similarly, second CPU 222 is coupled via third high bandwidth "X16" link 238 and fourth high bandwidth "X16" link 240 to PCIe devices 324 and 328, in third large "Physical Slot 4" 232 (FIG. 2) and fourth large "Physical Slot 5" 234 (FIG. 2), respectively. In addition, second CPU 222 is coupled via second lower bandwidth "X8" link 326 to an electronic component (not shown), such as an I/O card and/or a communication card, in second, smaller, low profile "LP slot #2" 330.

The CPU ports are coupled to PCIe devices/components such as PCIe devices 304, 308, 324 and 328, for example, positioned in a large physical slot location using a flexible peripheral component interconnect express (PCIe) media. Each of the PCIe devices/components provides a corresponding PCIe card. The flexible PCIe media includes: (i) a cable for connecting data signals and power supply signals to a specific physical slot; and (ii) a riser card (not shown) having a PCIe connector which is electrically coupled to the cable and which provides signal breakout to a standard connector. The flexible PCIe media is coupled to a mechanical mounting bracket to enable the flexible PCIe media to be positioned within a specified slot or sub-slot and be supported against a respective PCIe device. The riser card provides the data and power signals to the IT gear. For example, the riser card carries an x16 PCIe bus and 75 W of power.

Figure 4:
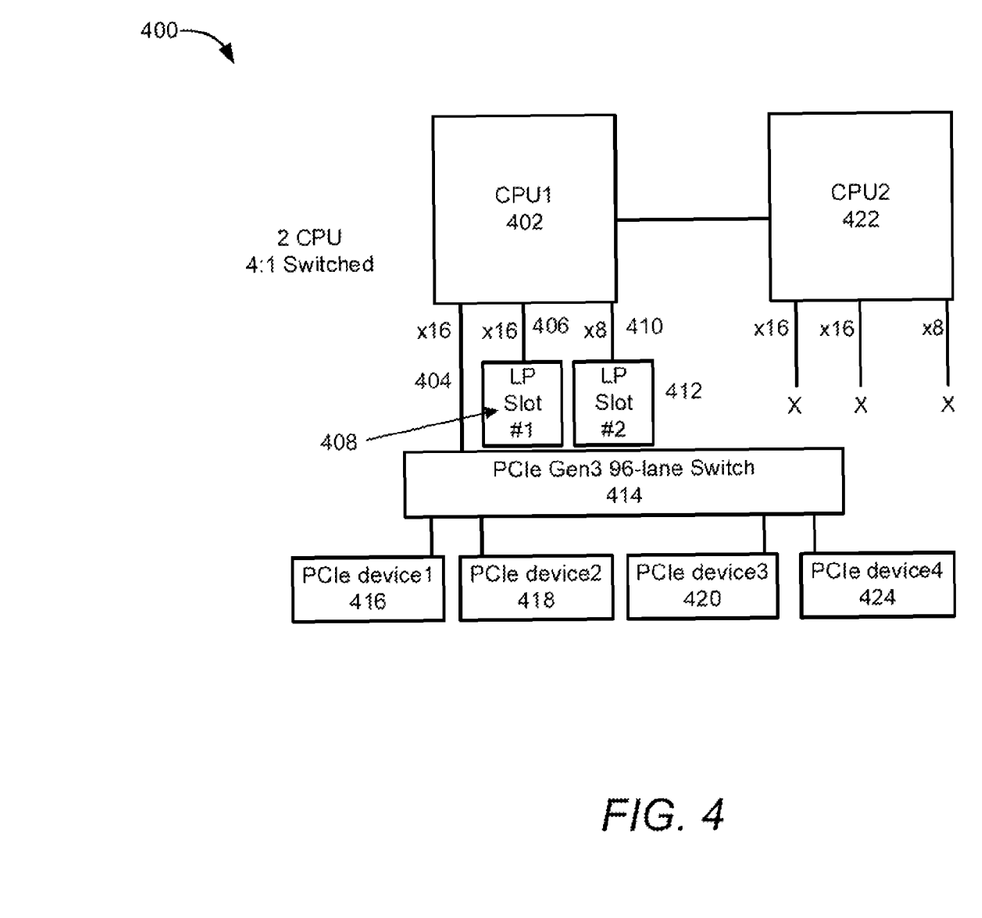
FIG. 4 illustrates an example 1 U server volume which includes two CPUs switchably coupled via PCIe links to four (4) adjacent PCIe devices in corresponding large physical slots, according to one embodiment.

FIG. 4 illustrates an example 1 U server volume which includes two CPUs switchably coupled via Peripheral Component Interconnect Express (PCIe) links to four (4) adjacent PCIe devices providing PCIe cards, e.g., GPUs, in corresponding large physical slots, according to one embodiment. Server volume 400 comprises first central processing unit (CPU1) 402 and second CPU (CPU2) 422. First CPU 402 is coupled via first high bandwidth "X16" link 404 to each of PCIe devices 416, 418, 420 and 424 via PCI Express (PCIe) switch 414. In addition, first CPU 402 is coupled via second higher bandwidth "X16" link 406 to first smaller, low profile "LP slot #1" 408. Additionally, first CPU 402 is coupled via first lower bandwidth "X8" link 410 to second smaller, low profile "LP slot #2" 412. In one embodiment, second CPU 422 is similarly connected to other components using switchable PCIe links. However, in another embodiment, second CPU 422 is directly connected to the other components.

Figure 5:
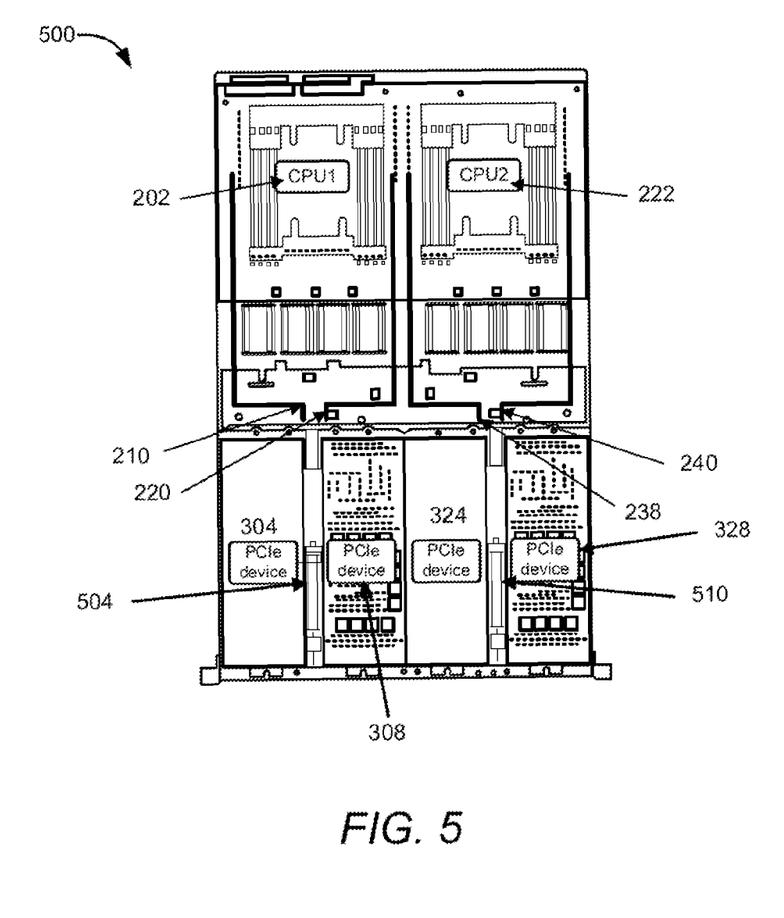
FIG. 5 illustrates an example 1 U server volume which includes two CPUs coupled via PCIe links to four (4) adjacent PCIe devices, according to one embodiment.

FIG. 5 illustrates an example 1 U server volume which includes two CPUs coupled via Peripheral Component Interconnect Express (PCIe) links to four (4) adjacent PCIe devices, according to one embodiment. Server volume 500 comprises first CPU 202 and second CPU 222. In addition, server volume 500 comprises first PCIe device 304, second PCIe device 308, third PCIe device 324 and fourth PCIe device 328, which are coupled via PCIe links 210, 220, 238 and 240 to first CPU 202 and second CPU 222, respectively. The PCIe links, such as first and second PCIe links 210 and 220, are provided using flexible signal cable routing that connects a respective CPU to a desired physical slot location, such as a slot location utilized by a pair of target PCIe devices (e.g., first PCIe device 304 and second PCIe device 308). The flexible signal cable routing is also referred to as flexible PCIe media herein. Server volume 500 also comprises first nested pair of riser cards 504 and second nested pair of riser cards 510.

First PCIe flexible media 210 provides and/or is coupled to a first riser card corresponding to a first PCIe device 304 while second flexible media 220 provides a second riser card corresponding to a second PCIe device 308 that is adjacent to the first PCI device 304. The first and second PCIe devices 304, 308 are physically arranged adjacent to each other in a joint and nested configuration within a narrow, first sub-slot (e.g., sub-slot 218 in FIG. 2) between adjacent physical slot locations corresponding to first and second PCIe devices 304, 308, respectively, to provide a first nested pair/assembly of adjacent riser cards 504.

As described, the first and second PCIe links are routed between the first and second PCIe devices and are coupled to first and second riser cards, respectively, which are arranged as a first nested pair of adjacent riser cards 504. The first and second PCIe links respectively connect data signals and power signals to the first and second riser cards. The nested configuration of adjacent riser cards is further described using FIG. 6.

Figure 6:
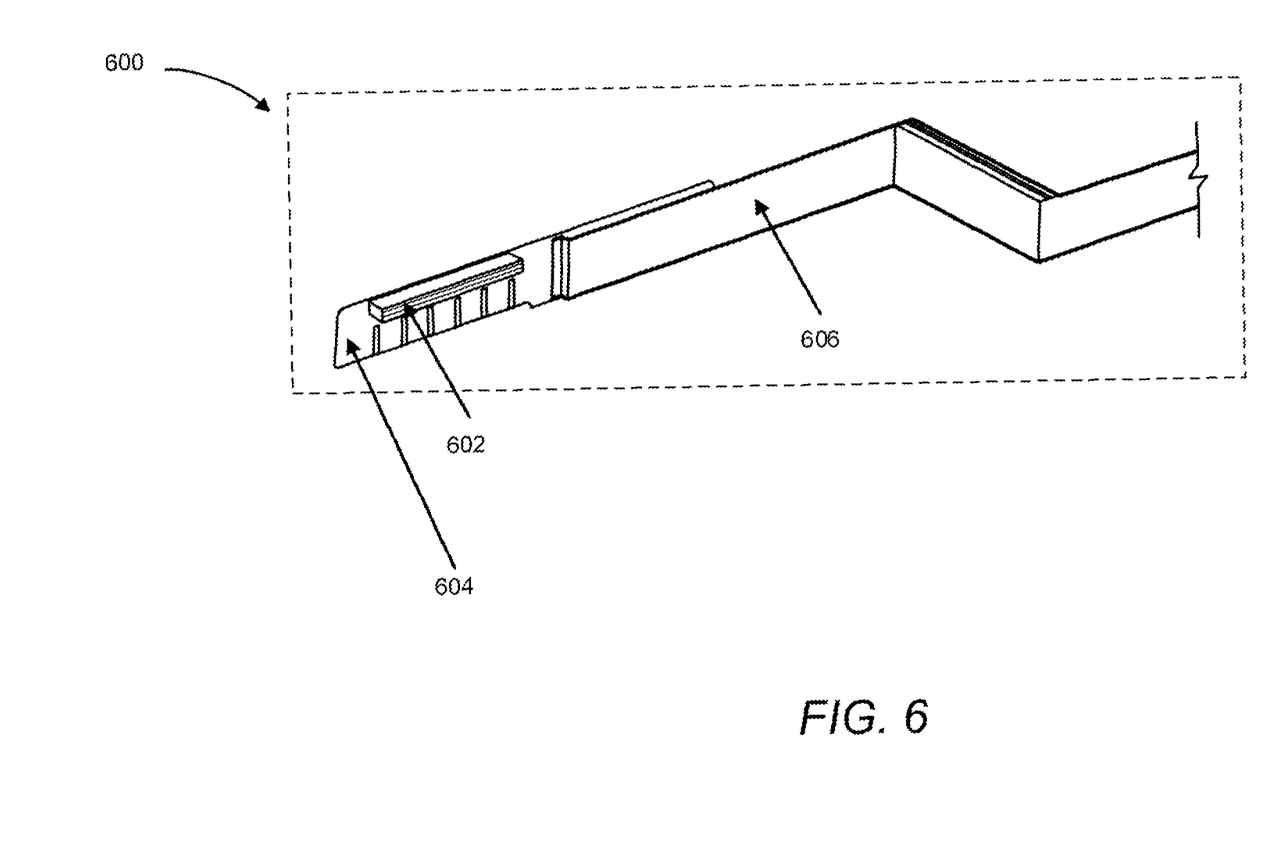
FIG. 6 illustrates a section of flexible PCIe media-riser assembly including a first riser card, according to one embodiment.

FIG. 6 illustrates a section of flexible PCIe media-riser assembly including a first riser card, according to one embodiment. First PCIe media-riser assembly 600 comprises first flexible PCIe media 606 and first riser card 604 coupled to first flexible PCIe media 606. First riser card 604 includes first PCIe connector 602. A second PCIe media-riser assembly (not shown) provides a second riser card which is designed so that the geometry and connector locations enable the second riser card to be positioned adjacent to the first riser card and oriented to provide the first nested pair of adjacent riser cards. The second riser card is substantially identically designed and configured similarly to first riser card 604. Furthermore, third and fourth flexible PCIe media respectively provide a third riser card and a fourth riser card that are electrically coupled to third and fourth PCIe devices 324, 328, respectively, which provide a second pair of adjacent PCIe devices. The third and fourth riser cards are substantially identically designed and configured comparable to a design and configuration of first riser card 604.

Figure 7:
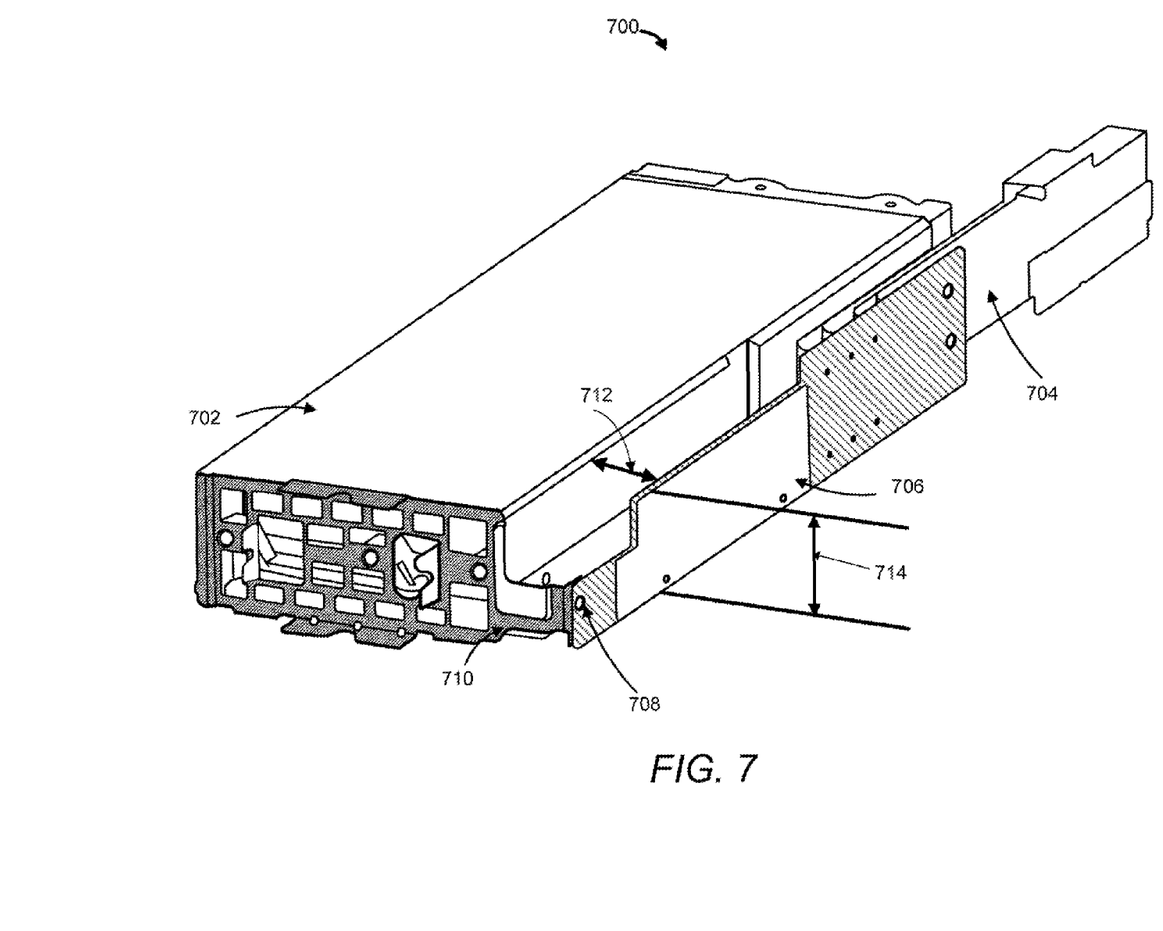
FIG. 7 illustrates a section of flexible PCIe media including a first riser card, and a PCIe device/GPU against which the flexible PCIe media is mounted, according to one embodiment.

FIG. 7 illustrates a server volume 700 having a section of flexible PCIe media including a first riser card, and a PCIe device against which the flexible PCIe media is mounted, according to one embodiment. Server volume 700 comprises first PCIe card 702 and a PCIe media-riser assembly, which includes flexible PCIe media 704 and riser card 706. Riser card 706 is physically coupled to first PCIe card 702. In addition, server volume 700 comprises mechanical mounting bracket 710 to which riser card 706 is physically coupled. Also illustrated within server volume 700 are horizontal space 712 located between the riser (e.g., first riser 706) and an exterior casing of first PCIe device 702, and vertical height 714 of a connector (affixed) section of riser card 706. Vertical height 714 is specifically determined to enable the second PCIe connector on second riser to fit into horizontal space 712, when identically designed riser cards are being nested against paired PCIe devices.

Mechanical mounting bracket 710 has mounting flanges that can be affixed to a chassis to secure an electronic device such as PCIe card 702 within a slot position without the mounting flanges extending beyond the chassis volume or the PCIe device volume. Unlike standard PCIe mounting brackets of conventional systems, mechanical mounting bracket 710 of server volume 700 provides mounting points 708, by which riser card 706 is coupled to mounting bracket 710. Mounting points 708 are located substantially within a corresponding nested volume and/or PCIe device and media-riser card assembly volume. Mechanical mounting bracket 710 enables a secure physical connection to be maintained between PCIe card 706 and the PCIe media-riser card assembly.

Figure 8:
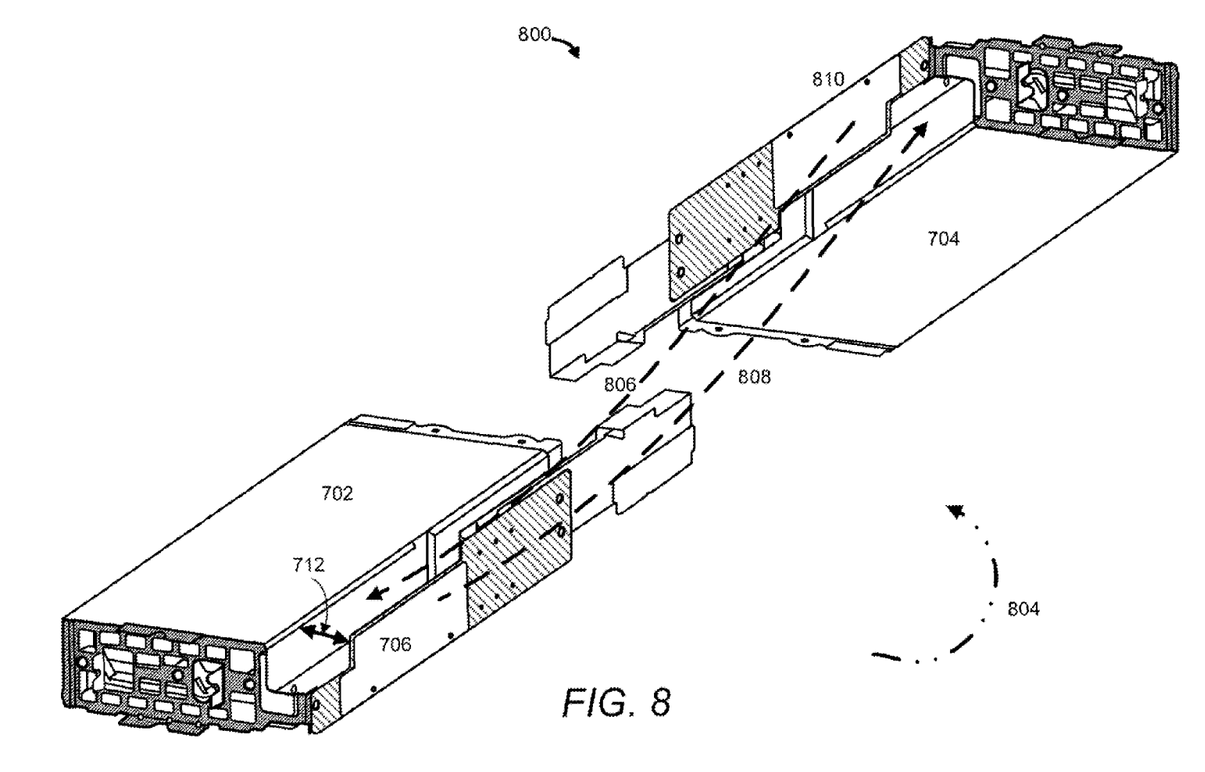
FIG. 8 illustrates a pair of PCIe devices which are oriented and positioned to provide a pair of adjacent PCIe devices and a nested pair of riser cards, according to one embodiment.

FIG. 8 illustrates a pair of PCIe devices which are oriented and positioned to provide a pair of adjacent PCIe devices and a nested pair of riser cards, according to one embodiment. Server volume 800 comprises first PCIe device 702 and second PCIe device 704 which, in one embodiment, has a substantially identical exterior physical extent compared to first PCIe device 702. Server volume 800 also comprises first riser card 706 corresponding to first PCIe device 702, and second riser card 810 corresponding to second PCIe device 704. First orientation arrow 804, second orientation arrow 806 and third orientation arrow 808 collectively indicate how the PCIe devices are moved and/or positioned relative to each other to provide the pair of adjacent PCIe devices and the nested pair of riser cards (e.g., nested pair of adjacent riser cards 504 of FIG. 5).

First orientation arrow 804 indicates that second PCIe device 704 is substantially rotated 180 degrees in a counter clockwise direction from a first orientation that is substantially identical to a current illustrated orientation of first PCIe device 702 to provide the current and second illustrated orientation of second PCIe device 704. Second orientation arrow 806 indicates that, following the rotation of 180 degrees, second PCIe device 704 is moved to an adjacent position beside first PCIe device 702, which enables an outer side of second riser card 810 of second PCIe device 704 to fit proximate to an exterior surface of first PCIe device 702. While second riser card 810 of second PCIe device 704 is being positioned proximate to an exterior surface of first PCIe device 702, an outer side of first riser card 706 of first PCIe device 702 is simultaneously being positioned proximate to an exterior surface of second PCIe device 704 while a first/inner side of the first riser card to be positioned facing a first/inner side of the second riser card, as indicated by third orientation arrow 808. Thus, the outer side of first riser card 706 is closely constrained by second PCIe device 704 of the pair of adjacent PCIe devices. Similarly, the outer side of second riser card 810 is closely constrained by first PCIe device 702 of the pair of adjacent PCIe devices. Furthermore, the relative positioning of the PCIe devices as indicated by the orientation arrows enables second riser card 810 to be fitted within a specified space 712 that, by design, exists between first PCIe device 702 and first riser card 706 to provide a higher density nested volume of adjacent riser cards. The close constraints drive design requirements and specifications for contour/outline dimensions of the riser cards, and an allowable height of the PCIe flexible media.

Figure 9:
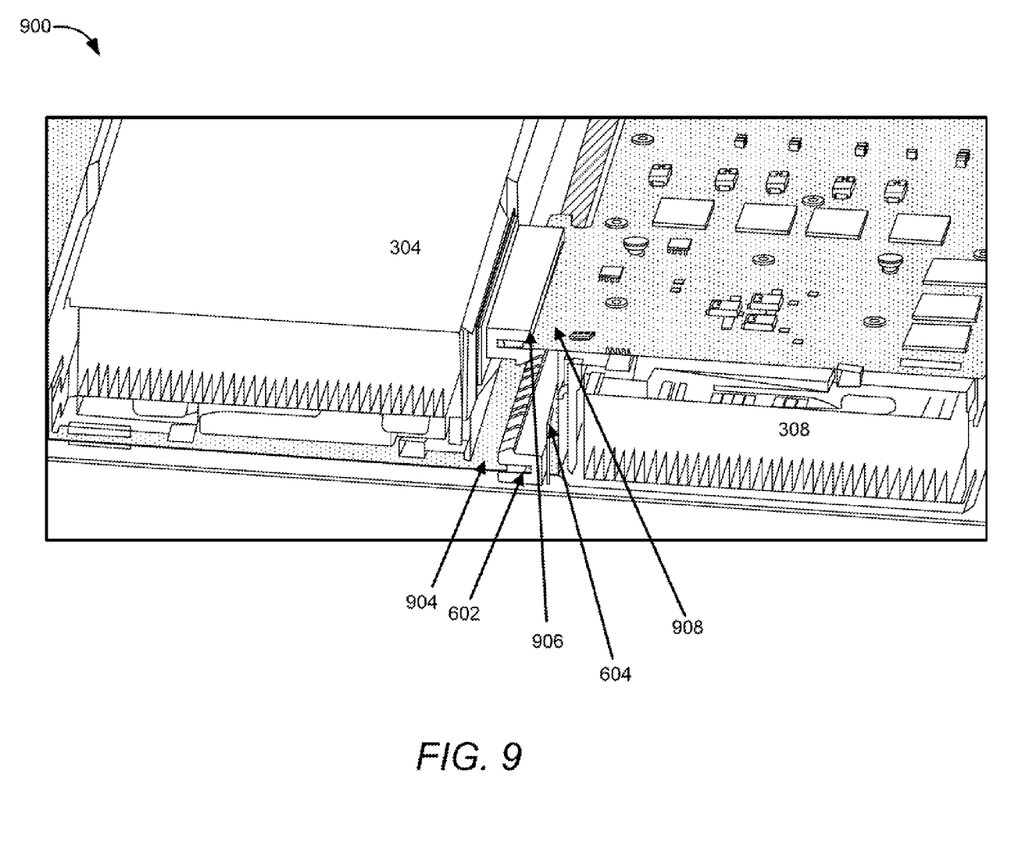
FIG. 9 illustrates a cross-section of an adjacent pair of PCIe devices, each providing a PCIe card inserted into a respective PCIe connector of a pair of nested riser cards, respectively, according to one embodiment.

FIG. 9 illustrates a cross-section of an adjacent pair of PCIe devices, each providing a PCIe card, such as a GPU, inserted into PCIe connectors of a pair of nested riser cards, respectively, according to one embodiment. View 900 comprises first PCIe device 304 and second PCIe device 308. In addition, view 900 includes first PCIe connector 602 and first PCIe card edge 904 (of first PCIe device 304) inserted into first PCIe connector 602. View 900 also shows second PCIe connector 906 and second PCIe card edge 908 inserted into second PCIe connector 906. First PCIe connector 602 is coupled to first riser card 604, and, similarly, second PCIe connector 906 is coupled to second riser card (not explicitly shown).

The first and second riser cards are substantially identically constructed and each PCIe connector of a riser card is located on a first/inner side of the respective riser card. However, in order to enable the first and second riser cards to be properly fitted within the first sub-slot to provide PCIe connectivity to respective IT gear, the first and second riser cards are positioned adjacent to each other in a specific orientation. In particular, as described using the illustration of FIG. 8, the second riser card is rotated and/or oriented to enable the first side of the first riser card to be positioned facing the first side of the second riser card. As a result, first PCIe connector 602 is located proximate to a lower perimeter of a corresponding joint riser volume while second PCIe connector 906 is located proximate to an upper perimeter of the joint riser volume. In addition, a footprint of second PCIe connector 906 overlaps a footprint of first PCIe connector 602.

The first nested pair of riser cards (504 of FIG. 5) are arranged to enable (i) first PCIe card edge 604 coupled to first PCIe device 304 to be inserted into first PCIe connector 602 of the first riser card and to extend horizontally below and beyond the second riser card and (ii) a second PCIe card edge 908 coupled to second PCIe device 308 to be inserted into second PCIe connector 906 of the second riser card and to extend horizontally above and beyond the first riser card.

In addition, the nesting of PCIe devices 304, 308 allows the PCIe connectors 906 and 602 to be stacked in a vertical space one above the other (i.e., within a same vertical plane but different horizontal planes). Unlike conventional designs and configurations which do not position the adjacent connectors in a vertical stack (i.e., the adjacent connectors are placed in different vertical places and a substantially identical horizontal plane), the first and second riser cards are designed and secured against respective PCIe devices to provide a nested riser volume having a higher density than a lower density of a total/combined riser space allocated, within conventional systems, to two riser cards. The lower density space of conventional systems forces PCI devices to be positioned farther apart than the more closely positioned PCIe devices of the disclosed system.

Figure 10:
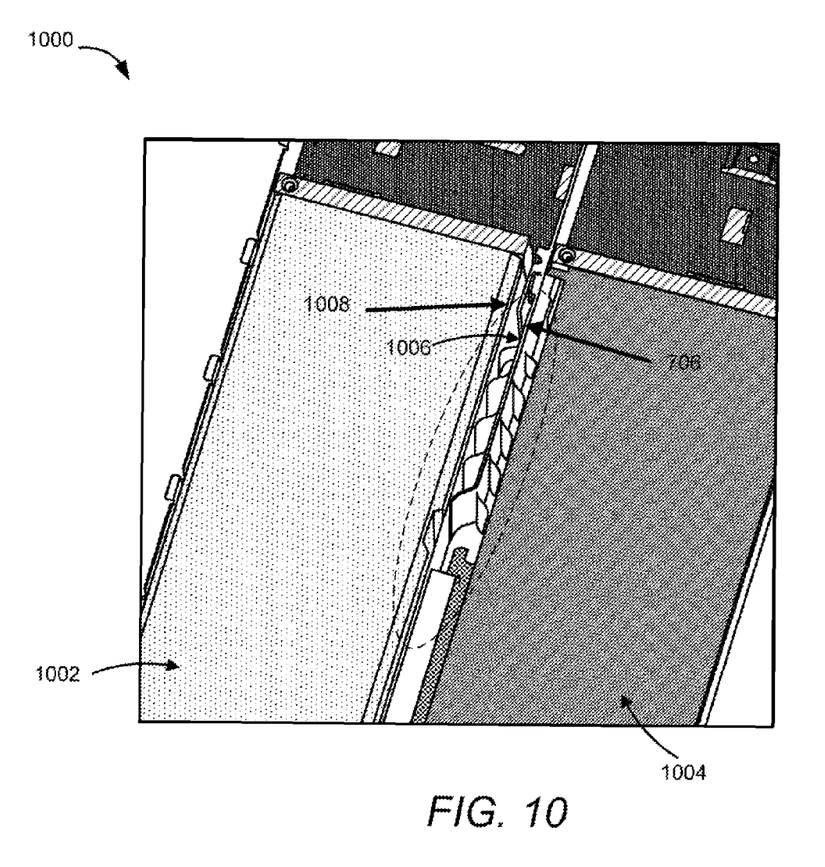
FIG. 10 illustrates a bird's eye view of a pair of nested riser cards located between adjacent PCIe devices/GPUs, according to one embodiment.

FIG. 10 illustrates a bird's eye view of a pair of nested riser cards located between adjacent PCIe devices, according to one embodiment. View 1000 comprises first PCIe device 1002 and second PCIe device 1004. In addition, view 1000 comprises nested volume portion 1006 which further comprises first riser card 706 corresponding to first PCIe device 1002 and second riser card 1008 corresponding to second PCIe device 1004. View 1000 illustrates that a size of a riser card (e.g., first riser card 706) and a spacing between the riser card (e.g., first riser card 706) and an exterior casing of first PCIe device 1002 is specifically determined to enable the identically designed riser cards to fit within the physical constraints of being nested against paired PCIe devices.

Within the nested volume, which includes nested volume portion 1006, a first flexible PCIe media and a second flexible PCIe media respectively provide data signals and power signals to first and second riser cards, which are positioned adjacent to each other and are arranged as a nested pair of riser cards.

Figure 11:
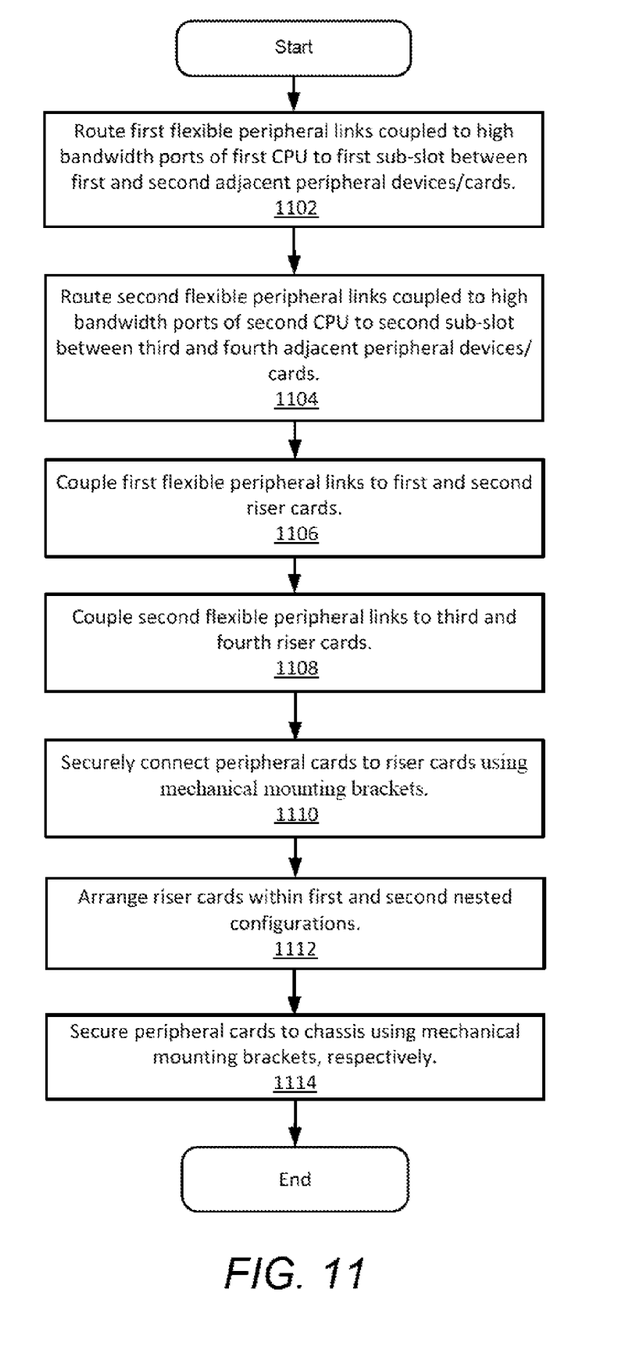
FIG. 11 is a flow chart illustrating a method for providing dense and nested PCIe mounting within an IHS, according to one embodiment.

FIG. 11 presents a flowchart illustrating an example method for providing dense and nested PCIe mounting within IHS 100 according to one or more embodiments of the disclosure. The description of the method is provided with general reference to the specific components illustrated within the preceding figures. It is appreciated that certain aspects of the described methods may be implemented via a manufacturing process that involves use of one or more processing devices and/or execution of other code/firmware. In the discussion of FIG. 11, reference is also made to elements described in FIGS. 1-10.

Method 1100 begins at the start block and proceeds to block 1102 at which a designer/manufacturer routes first flexible peripheral links coupled to high bandwidth ports of first CPU to first sub-slot between first and second adjacent peripheral devices. In addition, the manufacturer routes second flexible peripheral links coupled to high bandwidth ports of second CPU to second sub-slot between third and fourth adjacent peripheral devices (block 1104). The manufacturer couples first flexible peripheral links to first and second riser cards (block 1106). Additionally, the manufacturer couples second flexible peripheral links to third and fourth riser cards (block 1108). The manufacturer physically secures each riser card to a respective peripheral device using a mechanical mounting bracket (block 1110). The manufacturer arranges riser cards within first and second nested configurations (block 1112). The manufacturer secures peripheral cards to a rack chassis using mechanical mounting brackets (block 1114). The process concludes at the end block.

In the above described flow chart, aspects of the method may be embodied in a computer readable device containing computer readable code such that a series of functional processes are performed when the computer readable code is executed on a computing device. In some implementations, certain steps of the method are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
   at least one processor;
   a server volume providing a plurality of slots sized according to requirements of corresponding, inserted peripheral devices having respective peripheral cards, and designed to support various mechanical and cooling attributes;
   at least two flexible peripheral media, wherein each peripheral media includes:
      a cable for connecting data signals and power supply signals to a specific physical slot;
      a riser card having a peripheral connector and affixed to the cable and which provides signal breakout to a standard connector; and
      at least one mechanical mounting bracket to enable respective peripheral devices to be mounted within a specified slot; and
   wherein the at least two flexible peripheral media include a first riser card and a second riser card designed to be nested together to enable (i) a first peripheral card to be inserted into a first peripheral connector of the first riser card and to extend horizontally beyond the second riser card and (ii) a second peripheral card to be inserted into a second peripheral connector of the second riser card and to extend horizontally beyond the first riser card.

2. The method of claim 1, wherein:
   the peripheral devices are oriented and relatively positioned to (i) enable an outer side of the second riser card of the second peripheral device to fit proximate to an exterior surface of the first peripheral device and (ii) enable an outer side of the first riser card of the first peripheral device to fit proximate to an exterior surface of the second peripheral device.

3. The method of claim 1, wherein:
   the peripheral devices are oriented and relatively positioned to enable (i) the second riser card to be fitted within a specified space that exists between the first peripheral device and the first riser card and (ii) a footprint of the first peripheral connector to overlap a footprint of the second peripheral connector, in order to provide a higher density volume of adjacent and nested riser cards.

4. The method of claim 1, wherein:
   the riser cards are designed using selected specifications for (i) riser card outline dimensions and (ii) an allowable height of riser cards, in order to provide a nested pair of adjacent riser cards.

5. The IHS of claim 1, wherein the first riser card and the second riser card are positioned in adjacent positions relative to each other to provide a first nested pair of adjacent riser cards, wherein the first riser card and the second riser card are assembled substantially identical to each other, wherein each peripheral connector of a riser is located on a respective first, inner side of the riser, wherein the second riser is oriented to enable the first, inner side of the first riser to be positioned facing an inner side of the second riser, wherein the first peripheral connector is located proximate to an upper perimeter of a corresponding riser volume while the second peripheral connector is located proximate to a lower perimeter of the riser volume, wherein a first peripheral connector footprint overlaps a second peripheral connector footprint.

6. The IHS of claim 1, wherein each riser card is designed and shaped to enable (i) the first peripheral card to be inserted into the first peripheral connector and to extend horizontally beyond the second riser card without obstruction and (ii) the second peripheral card to be inserted in the second peripheral connector and to extend horizontally beyond the first riser card without obstruction.

7. The IHS of claim 1, wherein:
   the at least one processor is located on a motherboard that is designed having peripheral connections located at a central position of the server volume, wherein the peripheral connections can be routed to any slot location via a respective riser card.

8. The IHS of claim 1, wherein:
   each one of the at least one mechanical mounting bracket is physically coupled to a respective riser card, wherein each one of the at least one mechanical mounting bracket has mounting flanges that can be affixed to a chassis to secure a peripheral device within a slot position without the mounting flanges extending beyond the chassis volume.

9. The IHS of claim 1, wherein the at least one processor comprises two processors and the peripheral devices comprise one of (i) four peripheral component interconnect express (PCIe) devices which provide four PCIe cards, and (b) four graphics processing unit (GPU) cards, wherein the four GPU cards can be PCIe cards.

10. The IHS of claim 1, wherein the at least two flexible peripheral media support four (4×) Double Wide peripheral cards across a 1 U server volume or thin server bulkhead.

11. The IHS of claim 6, wherein the at least two flexible peripheral media comprise at least four flexible peripheral media respectively providing a third riser card and a fourth riser card positioned adjacent to each other to provide a second pair of adjacent riser cards, wherein the second pair comprises substantially identical riser cards as the first pair of riser cards, wherein the third and fourth riser cards are positioned and oriented substantially identical to a manner in which the first and second riser cards are positioned and oriented.

12. The IHS of claim 11, wherein:
   the first pair of riser cards is placed between a first slot and a second slot, and the second pair of riser cards is placed between a third slot and a fourth slot.

13. The IHS of claim 7, wherein:
the peripheral connections are electrically coupled to slot locations on a separate chassis having different physical characteristics.

14. The IHS of claim 7, wherein:
the peripheral connections are electrically coupled to respective slot locations using a switched connection.

15. An apparatus within an information handling system (IHS) having at least one processor and a server volume providing a plurality of slots sized according to requirements of corresponding, inserted peripheral devices having respective peripheral cards, the apparatus comprising:
at least two flexible peripheral media, wherein each peripheral media includes:
a cable for connecting data signals and power supply signals to a specific physical slot;
a riser card having a peripheral connector and affixed to the cable and which provides signal breakout to a standard connector; and
at least one mechanical mounting bracket to enable respective peripheral devices to be mounted within a specified slot; and
wherein the at least two flexible peripheral media include a first riser card and a second riser card designed to be nested together to enable (i) a first peripheral card to be inserted into a first peripheral connector of the first riser card and to extend horizontally beyond the second riser card and (ii) a second peripheral card to be inserted into a second peripheral connector of the second riser card and to extend horizontally beyond the first riser card.

16. The apparatus of claim 15, wherein:
the peripheral devices are oriented and relatively positioned to (i) enable an outer side of the second riser card of the second peripheral device to fit proximate to an exterior surface of the first peripheral device and (ii) enable an outer side of the first riser card of the first peripheral device to fit proximate to an exterior surface of the second peripheral device.

17. The apparatus of claim 15, wherein:
the peripheral devices are oriented and relatively positioned to enable (i) the second riser card to be fitted within a specified space that exists between the first peripheral device and the first riser card and (ii) a footprint of the first peripheral connector to overlap a footprint of the second peripheral connector, in order to provide a higher density volume of adjacent and nested riser cards.

18. The apparatus of claim 15, wherein:
the riser cards are designed using selected specifications for (i) riser card outline dimensions and (ii) an allowable height of riser cards, in order to provide a nested pair of adjacent riser cards.

19. The apparatus of claim 15, wherein the first riser card and the second riser card are positioned in adjacent positions relative to each other to provide a first nested pair of adjacent riser cards, wherein the first riser card and the second riser card are assembled substantially identically, wherein each peripheral connector of a riser is located on a respective first, inner side of the riser, wherein the second riser is oriented to enable the first, inner side of the first riser to be positioned facing an inner side of the second riser, wherein the first peripheral connector is located proximate to an upper perimeter of a corresponding riser volume while the second peripheral connector is located proximate to a lower perimeter of the riser volume, wherein a first peripheral connector footprint overlaps a second peripheral connector footprint.

20. The apparatus of claim 15, wherein each riser card is designed and shaped to enable (i) the first peripheral card to be inserted into the first peripheral connector and to extend horizontally beyond the second riser card without obstruction and (ii) the second peripheral card to be inserted in the second peripheral connector and to extend horizontally beyond the first riser card without obstruction.

21. The apparatus of claim 15, wherein:
the at least one processor is located on a motherboard that is designed having peripheral connections located at a central position of the server volume, wherein the peripheral connections can be routed to any slot location via a respective riser card.

22. The apparatus of claim 15, wherein:
each one of the at least one mechanical mounting bracket is physically coupled to a respective riser card, wherein each one of the at least one mechanical mounting bracket has mounting flanges that can be affixed to a chassis to secure a peripheral devices within a slot position without the mounting flanges extending beyond the chassis volume.

23. The apparatus of claim 15, wherein the at least one processor comprises two processors and the peripheral devices comprise one of (i) four peripheral component interconnect express (PCIe) devices which provide four PCIe cards and (ii) four graphics processing unit (GPU) cards, wherein the four GPU cards can be PCIe cards.

24. The apparatus of claim 15, wherein the at least two flexible peripheral media support four (4×) Double Wide peripheral cards across a 1 U server volume or thin server bulkhead.

25. The apparatus of claim 20, wherein the at least two flexible peripheral media comprise at least four flexible peripheral media respectively providing a third riser card and a fourth riser card positioned adjacent to each other to provide a second pair of adjacent riser cards, wherein the second pair comprises substantially identical riser cards as the first pair of riser cards, wherein the third and fourth riser cards are positioned and oriented substantially identical to a manner in which the first and second riser cards are positioned and oriented.

26. The apparatus of claim 25, wherein:
the first pair of riser cards is placed between a first slot and a second slot, and the second pair of riser cards is placed between a third slot and a fourth slot.

27. The apparatus of claim 21, wherein:
the peripheral connections are electrically coupled to slot locations on a separate chassis having different physical characteristics.

28. The apparatus of claim 21, wherein:
the peripheral connections are electrically coupled to respective slot locations using a switched connection.

* * * * *